US011028989B2

(12) United States Patent
Aparo

(10) Patent No.: US 11,028,989 B2
(45) Date of Patent: *Jun. 8, 2021

(54) VEHICLE HEADLIGHT DEVICE HAVING AN EJECTABLE AND REPLACEABLE LIGHTBULB ASSEMBLY

(71) Applicant: James M. Aparo, Gloucester, MA (US)

(72) Inventor: James M. Aparo, Gloucester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/895,995

(22) Filed: Jun. 8, 2020

(65) Prior Publication Data

US 2021/0140600 A1 May 13, 2021

Related U.S. Application Data

(63) Continuation-in-part of application No. 16/777,227, filed on Jan. 30, 2020.
(Continued)

(51) Int. Cl.
*F21S 41/19* (2018.01)
*F21V 17/18* (2006.01)
(Continued)

(52) U.S. Cl.
CPC ............ *F21S 41/192* (2018.01); *F21V 17/18* (2013.01); *B60Q 1/0064* (2013.01); *F21S 41/13* (2018.01);
(Continued)

(58) Field of Classification Search
CPC ........ F21S 41/13; F21S 41/141; F21S 41/172; F21S 41/18; F21S 41/198; B60Q 1/0064
See application file for complete search history.

(56) References Cited

U.S. PATENT DOCUMENTS 2,032,515 A * 3/1936 Troup .................... F21V 19/04
362/20
3,283,141 A * 11/1966 Field ..................... H01J 9/006
362/220
(Continued)

FOREIGN PATENT DOCUMENTS

CN 107842770 A 3/2018
DE 3910191 C1 7/1990
(Continued)

OTHER PUBLICATIONS

International Search Report and the Written Opinion of the International Searching Authority in PCT Application No. PCT/US2020/059946, dated Feb. 8, 2021.

*Primary Examiner* — Zheng Song
(74) *Attorney, Agent, or Firm* — Antoinette G Giugliano; Antoinette G Giugliano PC

(57) ABSTRACT

The present invention relates to an ejectable headlight device for replacement of a lightbulb assembly from the front of a vehicle. The lightbulb assembly of the present invention has at least one lightbulb pin, a lightbulb base, a replaceable electromagnetic radiation source, an electrical connector, and a replaceable lens. The ejectable headlight device includes an ejector, a base that houses the ejector and has at least one guide for receiving the lightbulb pin. The device has a release arm that engages the lightbulb pin. The device further includes a pivot point and a pull attached to the release arm. When the release arm secures the lightbulb pin to the base, the device is in the locked position. When the pull engages the release arm to put the device in the unlocked position, the release arm pivots about the pivot point and disengages the lightbulb pin.

18 Claims, 7 Drawing Sheets

Related U.S. Application Data

(60) Provisional application No. 62/934,707, filed on Nov. 13, 2019.

(51) Int. Cl.
    *F21S 41/13*     (2018.01)
    *F21S 41/172*    (2018.01)
    *F21S 41/141*    (2018.01)
    *F21S 41/162*    (2018.01)
    *B60Q 1/00*      (2006.01)

(52) U.S. Cl.
    CPC ............ *F21S 41/141* (2018.01); *F21S 41/162* (2018.01); *F21S 41/172* (2018.01)

(56) References Cited

U.S. PATENT DOCUMENTS

| | | | |
|---|---|---|---|
| 3,529,146 A * | 9/1970 | Betlejewski | F21V 25/04 362/254 |
| 3,688,103 A | 8/1972 | Daumuller | |
| 4,217,626 A | 8/1980 | Bindle et al. | |
| 4,402,038 A * | 8/1983 | Hartung | F21V 19/04 362/20 |
| 4,507,712 A | 3/1985 | Dolan et al. | |
| 4,528,619 A | 7/1985 | Dolan et al. | |
| 4,569,005 A | 2/1986 | Bergin et al. | |
| 4,569,006 A | 2/1986 | Bergin et al. | |
| 4,614,015 A * | 9/1986 | Nagare | B25B 27/02 29/239 |
| 4,623,958 A | 11/1986 | Van Der Linde et al. | |
| 4,631,651 A | 12/1986 | Bergin et al. | |
| 4,648,014 A | 3/1987 | Dick et al. | |
| 4,682,274 A | 7/1987 | Freudenreich et al. | |
| 4,719,543 A | 1/1988 | Coliandris et al. | |
| 4,967,318 A | 10/1990 | Ewert et al. | |
| 5,205,633 A | 4/1993 | Kasboske | |
| 5,239,226 A | 8/1993 | Seredich et al. | |
| 5,285,357 A | 2/1994 | Makita | |
| 6,093,999 A | 7/2000 | English et al. | |
| 6,183,113 B1 * | 2/2001 | Waldmann | F21V 17/12 362/263 |
| 7,128,454 B2 | 10/2006 | Kim et al. | |
| 7,387,424 B2 | 6/2008 | Koegler, III et al. | |
| 7,550,908 B2 | 6/2009 | Arndt et al. | |
| 7,806,562 B2 | 10/2010 | Behr et al. | |
| 7,850,362 B2 | 12/2010 | Yu | |
| 9,061,628 B2 | 6/2015 | Moisy et al. | |
| 9,822,945 B2 | 11/2017 | Bailly et al. | |
| 10,161,614 B2 | 12/2018 | Creusen et al. | |
| 2015/0047167 A1 | 2/2015 | Gonzalez, III | |
| 2015/0252973 A1 | 9/2015 | Muller | |
| 2015/0266407 A1 | 9/2015 | Rubia Mena et al. | |
| 2016/0131324 A1 | 5/2016 | Windgruber | |
| 2017/0198875 A1 | 7/2017 | Creusen et al. | |
| 2018/0031194 A1 | 2/2018 | Seiger et al. | |
| 2018/0245765 A1 | 8/2018 | Maskiw | |
| 2018/0306972 A1 | 10/2018 | Conrad | |
| 2020/0164787 A1 | 5/2020 | Aparo | |

FOREIGN PATENT DOCUMENTS

| | | |
|---|---|---|
| EP | 0188260 B1 | 7/1991 |
| EP | 1702795 A2 | 9/2006 |
| FR | 2721563 A2 | 12/1995 |
| WO | WO2016008738 A1 | 1/2016 |

\* cited by examiner

VEHICLE HEADLIGHT DEVICE HAVING AN EJECTABLE AND REPLACEABLE LIGHTBULB ASSEMBLY

RELATED APPLICATION

This application is a continuation-in-part of U.S. application Ser. No. 16/777,227, entitled, "Vehicle Headlight Assembly Having An Ejectable And Replaceable Lightbulb" by James M. Aparo., filed Jan. 30, 2020, which claims the benefit of U.S. Provisional Application No. 62/934,707, entitled, "Vehicle Headlight Assembly Having An Ejectable And Replaceable Lightbulb" by James M. Aparo, filed Nov. 13, 2019.

The entire teachings of the above application are incorporated herein by reference.

BACKGROUND OF THE INVENTION

Generally, replacement of a headlight lightbulb, for most vehicles, requires special knowledge, specific tools, and/or assistance from a mechanic. Furthermore, prior to the present invention, accessing the headlight housing from above, after opening the hood, often involves moving or removing other parts (e.g., window washer reservoir, engine air intake duct and the like) of the vehicle to get them out of the way. Once accessed, the entire headlamp including its housing is often replaced. As a result, replacing a headlight lightbulb can be costly.

Additionally, when a headlight lightbulb is replaced, it is typically replaced with a "visible" light type lightbulb such as a halogen (e.g., emit an "orange" light), a High Intensity Discharge bulb (HID) (e.g., emits a "white" bright light) or a Light Emitting Diode (LED).

A need exists for easier access for replacement of a headlight lightbulb. Specifically, a need exists for ejection and replacement of the headlight lightbulb from the front of the vehicle. An additional need exists to replace the lightbulb and leave the headlight housing intact. Yet a further need exists to replace the lightbulb easily, efficiently and cost effectively with an option to utilize lightbulbs that emit various types of light.

SUMMARY OF THE INVENTION

The present invention relates to an ejectable headlight device for replacement of one or more lightbulb assemblies from the front of a vehicle, wherein the lightbulb assembly has been modified to include one or more lightbulb pins. The device includes one or more ejectors, and a base that houses the ejector. In an embodiment, the base also houses the electrical receptacle for receiving lightbulb plug. The base has one or more guides for receiving one or more lightbulb assembly pins. The device further includes a release arm, at the base, that engages the one or more lightbulb pins and a pivot point, also at the base; wherein when the release arm is engaged, the release arm pivots about the pivot point. The device has a pull attached to the release arm, wherein the pull can engage the release arm. When the release arm secures the one or more lightbulb pins to the base, the lightbulb assembly and/or device is in the locked position. When the pull engages the release arm which, in turn, allows the release arm to pivot about the pivot point and disengage the one or more lightbulb pins, the lightbulb assembly and/or device is in the unlocked position. When the lightbulb assembly is in the unlocked position, the lightbulb pin slides along the guides to thereby release the lightbulb assembly toward the front of the vehicle (e.g. in an axis from the base of the bulb to the front of the car or path directed by the guides). In an embodiment, the ejector comprises a spring (e.g., a compression coil). In one aspect, the release arm includes a release arm base, a first release arm side, a second release arm side, a first release arm extension and a second release arm extension, wherein the first release arm side opposes the second release arm side. In another aspect, the pivot point is a pivot pin that is secured by the first release arm side and the second release arm side, wherein the pivot pin defines an axis. The release arm pivots about or is pivotable about the axis defined by the pivot pin. The base, for example, has a cylindrical wall and a ridge. When the device is in a locked position, the compression coil exerts force against the ridge and the lightbulb assembly. When the pull is engaged and the release arm disengages with the lightbulb pin, the compression coil exerts force against the ridge and the lightbulb assembly to release the lightbulb assembly. In an embodiment, the device of the present invention has one or more visible light lightbulbs, infrared lightbulbs, ultraviolet lightbulbs and any combination thereof.

Another aspect of the invention relates to the ejectable lightbulb assembly itself. The lightbulb assembly is for an ejectable headlight device, described herein. The lightbulb assembly has one or more lightbulb pins, a lightbulb base, an electromagnetic radiation source (e.g., light source meaning visible light lightbulbs, infrared lightbulbs, ultraviolet lightbulbs, or combination thereof), an electrical connector, and a lens. The lightbulb assembly can further include optics, as described herein. Visible light lightbulb includes halogen bulbs, High Intensity Discharge (HID) bulbs, Light Emitting Diode (LED) bulbs, or a combination thereof.

The present invention further pertains to methods for using an ejectable headlight device, described herein, having a lightbulb assembly that is to be replaced, wherein the lightbulb assembly has a pin (e.g., also referred to as a first lightbulb assembly with a first pin). The method comprises the steps of engaging the pull, wherein the pull engages the release arm which allows the release arm to pivot about the pivot point and disengage the first lightbulb pin, thereby putting the first lightbulb assembly (e.g., the lightbulb assembly to be replaced) in the unlocked position. The inventive methods further included removing the first lightbulb assembly from the front of the vehicle and after removing the first lightbulb assembly, inserting from the front of the vehicle a second lightbulb assembly (e.g., a new or replacement lightbulb assembly) having a lightbulb pin, wherein the release arm secures the second lightbulb pin to the base, thereby putting the second lightbulb assembly in the locked position. When replacing the lightbulb assembly, one can replace the light source only, the lens only or both. Accordingly, the second lightbulb assembly or the replacement lightbulb assembly, above, refers to an assembly that has a replacement light source, a replacement lens and/or both. Alternatively, a new lightbulb assembly can replace the old/first lightbulb assembly.

The present invention also relates to an ejectable headlight system or kit for replacement of the lightbulb assembly from the front of a vehicle. The system or kit includes the device described herein and/or the inventive lightbulb assembly described herein.

Advantageously, the present invention allows for easier access for replacement of the headlight lightbulb assembly, the electromagnetic radiation source (e.g., the bulb itself or filament) or lens. Specifically, the present invention allows one to eject and replace a headlight lightbulb assembly from the front of the vehicle and leave the headlight housing intact. The present invention provides for easy, efficient and cost-effective headlight lightbulb assembly replacement. Yet another advantage of the present invention is that it allows emission of various types of light (e.g., visible light lightbulbs, infrared lightbulbs, ultraviolet lightbulbs, or combination thereof).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
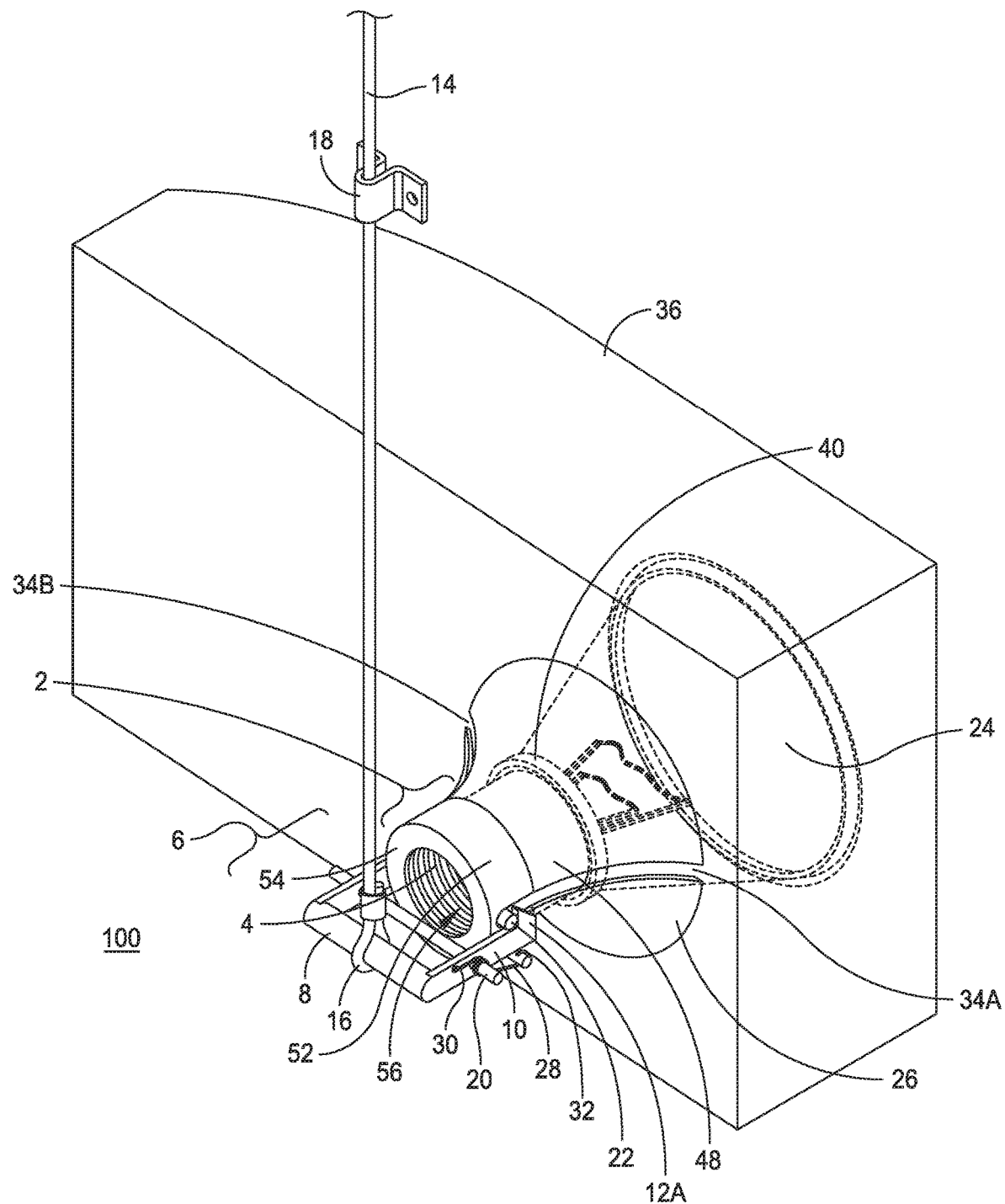
FIG. 1 is a perspective view of the vehicle headlight device 100 (also referred to as an "ejectable headlight device") of the present invention with the lightbulb assembly in the locked position.

A description of preferred embodiments of the invention follows.

The present invention relates to a vehicle headlight device having an ejectable and replaceable lightbulb assembly. The present invention allows for quick and efficient replacement of a lightbulb assembly for a vehicle. The present invention allows one to replace the bulb from the front of the vehicle without any tools.

Referring to FIG. 1A, the vehicle headlight device 100 (also referred to as an "ejectable headlight device") of the present invention is configured to release a vehicle headlight bulb using a spring release system. Specifically, the ejectable headlight device 100 of the present invention involves base 2, shaped like a cap with cylindrical wall 52 and ridge 54 defining a circular opening 56. Base spring 4 resides within base 2 and provides the force to release lightbulb assembly 24 when release arm 6 disengages lightbulb pin 22. When the user engages control cable 14 which is attached to release arm base 8, the upward movement of the control cable causes the release arm to pivot at pivot pin 20. When this happens, release arm extensions 12A and 12B (FIG. 4) move along a circular path and releases lightbulb pin 22 from base 2. Once lightbulb pin 22 at base 2 is released, the force of the base spring 4 pushes lightbulb assembly 24 along guides 34A and 34B. The lightbulb assembly is ejected along an axis defined from the lightbulb assembly base to the front of the vehicle and is ejected in a path directed by the guides. The lightbulb assembly can then be removed from the front of the vehicle and replaced.

Specifically starting with base 2, base 2 has cylindrical wall 52, ridge 54, base opening 56 and at least a portion of guides 34A and 34B. Base 2 acts as the base spring's housing. When the release arm 6 engages the pin 22 of lightbulb assembly 24 and is in a locked position (as shown in FIG. 1), base spring 4 is in a contracted position. Base spring 4 exerts force against ridge 54 of base 2 at one end and against the lightbulb assembly base 48 at the other end. Cylindrical wall 52 contains the base spring and keeps the base spring in alignment from the base end to the lightbulb end. Although the base is cylindrical in one aspect, the base can take on any shape, or be continuous or discontinuous, so long as the base houses at least a portion of the spring, can receive the bulb, and has a ridge, wall or surface on to which the spring can act to eject the lightbulb assembly. Although base 2 has the shape of a cap (cylindrical wall with a circular ridge), it can be prism (e.g., square, pyramidal, rectangular) or have an irregular shape. The base can be made of a metal, alloy, stainless steel, plastic, rubber, resin, composite, and the like. The base can be made of materials now known or developed in the future and/or bear any shape so long as it houses at least part of the spring, receives a lightbulb assembly base, acts to provide a point of contact for the ejection force, and has a portion of the guides to receive the lightbulb pin. The base can optionally include an additional feature, such as a retainer clip, that allows for the spring to be retained when release arm disengages the pin and the ejection force is exerted. Such a feature can include, for example, a clip, retainer lip, adhesive, retainer, stopper, attachment, fastener, and the like.

In an embodiment, the ejector is base spring 4 shown in FIG. 1. Base spring 4 is a coil compression spring. Coil springs are those that are formed by winding a wire around a cylinder. A compression spring is one that gets shorter when a load is applied. Other ejection devices can be used to create the force needed to expel the lightbulb assembly when the release arm releases the lightbulb pin. For example, when the release arm releases the pin, the arm can move a spring, an extension, finger, projection, compression pad, and the like that ejects lightbulb assembly 24. The spring can be made from a variety of elastic materials, steel, metals, alloys, plastic, polymers, and the like. Non-ferrous metals can be used to make the base spring, such as phosphor bronze and titanium or beryllium copper. Materials used for the ejector or base spring can be known or ones developed in the future.

In the embodiment shown in the figures, base 2 has a portion of guides 34A and 34B. One or more guides can be used. The guides are channels into which lightbulb pin 22 of lightbulb assembly 24 slides. The guides allow the bulb to be in proper alignment during insertion into the base. The guides also can be of any shape and size so long as it receives a portion of the lightbulb assembly and aligns the lightbulb assembly. The guides are continuous along base extension 26 until the lightbulb assembly is released. The guides can be, in one embodiment, a channel, groove, an opening, a walled opening, a tunnel, or a trough. Guides can be drilled, milled, etched, molded, 3D printed, or otherwise carved into the base and base extension. In an embodiment the base and base extension is a single piece and in other embodiments they are made of more than one piece but connected or in communication with one another. The guides are configured to receive the lightbulb pin or portion of the bulb to engage the guides. In particular, the guides can be shaped to complement the pin or portion of the bulb used to engage the guides. In the figures, the guides oppose one another. In an embodiment, there may be one guide or in the case of more than one guide, the guides can be positioned in any arrangement. The pin and guide arrangement can be configured by auto manufacturers to distinguish types of bulbs or to specify bulbs to fit a particular make or model vehicle to ensure that the proper bulb is being placed therein.

The guides are used to receive a pin or portion of the lightbulb assembly that allows the bulb to be aligned within the base. Lightbulb pin 22 in FIG. 1 is a cylindrical projection or finger. The pin can be any shape so long at it fits within the guide. For example, the pin can be a nub, outcrop, protuberance, ledge, ridge, jut, overhang, projection, finger, and the like. The pin can be any shape so long as it fits within the guide to allow proper placement of the bulb. The pin can be made of a metal, alloy, stainless steel, plastic, rubber, resin, composite, and the like. The pin can be made of materials now known or developed in the future and/or bear any shape so long as it slides along the guide and allows for the lightbulb assembly to be locked and unlocked.

Release arm 6 includes arm extensions 12A and 12B (not shown), release arm base 8 and release arm sides 10 disposed therebetween. Lightbulb pin 22 is engaged by arm extensions 12A and 12B of release arm 6. Arm extension 12A and 12B consist of a bent projection or extension that engages pin 22. The arm extension can be of any shape as long as it can lock the lightbulb pin or equivalent. The arm extension can be a clip, hook, stopper, latch, circular catch, lever, or any kind of catch mechanism or other mechanism that locks the lightbulb pin or equivalent into place. When release arm engages the pin, the lightbulb assembly is in the locked position. When the release arm disengages the pin, the lightbulb assembly is in the unlocked position, shown in FIG. 6. In the locked position, as shown in FIG. 1, the spring is in a compressed position and exerts force against the base ridge 54 and lightbulb assembly base 48. When the arm extension engages the pin and is in the locked position, the spring is compressed and has potential energy in the locked position. When the release arm disengages the pin, the potential energy of the spring converts to kinetic energy and exerts force to eject the lightbulb assembly along the guides.

Figure 6:
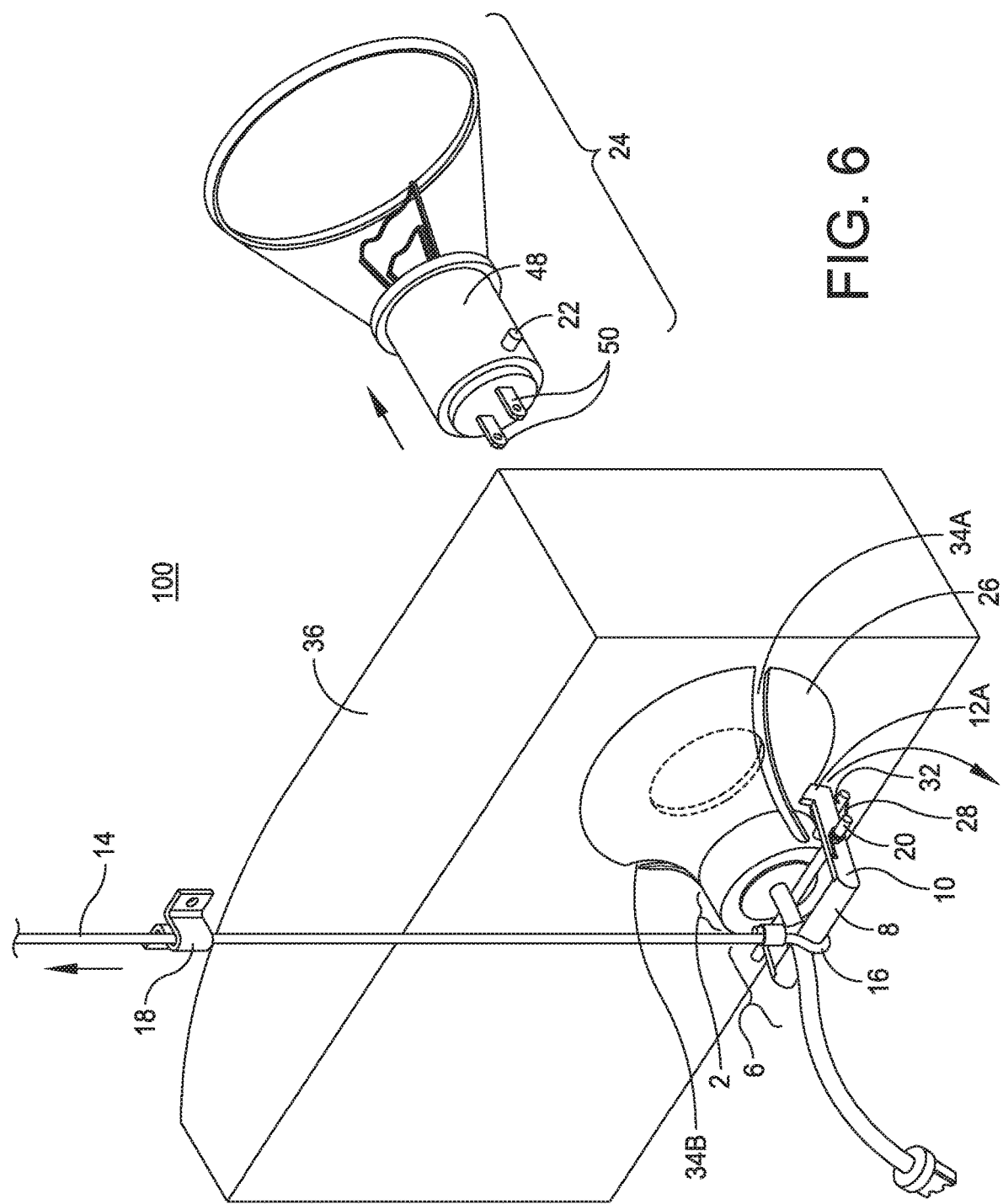
FIG. 6 is a perspective view of the vehicle headlight device with the lightbulb assembly in the unlocked position and the lightbulb assembly ejected.

The release arm can be made of a metal, alloy, stainless steel, plastic, rubber, resin, composite, and the like. The release arm can be made of materials now known or developed in the future and/or bear any shape so long as it allows for the lightbulb assembly to be locked (FIG. 1) and unlocked (FIG. 6).

In FIG. 1, the release arm forms a three-sided rectangular shape so that it can engage a lightbulb pin on either side. The present invention includes any combination of pins and release arm arrangements. In one aspect, there can be only one release arm extension and one pin, and in another aspect, there can be two or more.

The release arm utilizes release spring 28 which keeps the release arm in place when control cable 14 is not engaged. Release spring 28 is attached to release spring base anchor 32 which is attached to base 2. The other end of the release spring 28 is attached to the release arm side 10 at release spring arm anchor 30. The middle portion is wrapped around the pivot pin. In an embodiment, the release spring is a torsion spring which works by twisting along its axis. It stores mechanical energy when it is twisted. When it is twisted, it exerts a torque in the opposite direction, proportional to the amount (angle) it is twisted. The release spring's tension allows the arm to stay in the locked position. When the control cable is engaged by a user, the force of the pull of the control cable overrides the tension in the release spring and allows the release arm to pivot about pivot pin 20. Other devices can be used to create the force needed to hold the release arm in the locked position. For example, a spring, an extension, finger, projection, or device providing a downward force on the release arm, and the like can be used to keep the release arm in place when control cable 14 is not engaged. The spring can be made from a variety of elastic materials, steel, metals, alloys and the like. Non-ferrous metals can be used to make the release spring, such as phosphor bronze and titanium or beryllium copper. Materials used for the release spring can be known or developed in the future. Safety features and fail safes can also be installed to prevent unwanted release of the lightbulb assembly.

Pivot pin 20 is simply a solid cylinder that protrudes through the sides of the release arms and rests at base 2. The pivot pin show in FIG. 1 is disposed between release arm sides 10 and is held in place by them. Pivot pin 20 defines an axis about which the release arm rotates. As control cable is engaged or released, the release arm side rotates about the axis defined by pivot pin 20.

The pivot pin need not be a pin. Two separate points of attachments can be used on each side of the release arm to act as a pivot point. The pivot points, in certain embodiments, can include an axle, rod, spindle, swivel, hub and the like.

Additional supports can be used in the present invention where needed. In one example, supports can be used on the inside of the release arm sides to connect the pivot pin to the base.

The control cable 14 acts as a pull and engages release arm base 8 of release arm 6 at the cable attachment 16. A control cable, as used herein, is a cable having a sheath within which the cable slides. Cable attachment 16 is essentially a loop that attaches to the release arm base. Any type of attachment can be used to attach the control cable to the release arm. The other end of the control cable is attached to the top of the housing or a part of the automobile using cable anchor 18. Other items can be used to engage the release arm. In addition to using a control cable, a regular cable, a pull, a rod, a bar, chain, rope, cord and the like can be used. Materials that can be used for the pull include stainless steel, metal, fibers, rope, plastic and the like. Materials used for the pull can be known or developed in the future.

Housing 36 showing in FIG. 1 is the housing for vehicle headlight device. It is a partial rectangle shape and allows for the headlight device of the present invention to be encased, except for the lens of the lightbulb assembly. The housing can be any shape including a prism (e.g., square, pyramidal, rectangular) or have an irregular shape. The housing can be adapted to fit the ejectable headlight device of the present invention and the vehicle.

Accordingly, certain parts of the present invention can be manufactured as a single piece or as separate pieces that are attached to one another. The pieces of the present invention can be made from the same material or different materials and can be solid and/or continuous or discontinuous. In general, materials that can be used to make the present invention, for example, include metal, alloy, stainless steel, plastic (e.g., thermoplastics and thermosetting polymers), rubber, resin, composite and the like. Materials now known or developed in the future can be used. Parts or pieces of the present invention can be 3D printed as well.

With respect to the headlight or lightbulb assembly, current automobile headlights can be modified to be used with the present invention. For example, headlight bases can be modified to include lightbulb pins 22 or equivalent and adapted to be used with guides 34A and 34B. Headlights assemblies of the present invention can further include reflective coating e.g., on lens support 58A to accommodate various types of light. Examples of light or electromagnetic radiation that can be used with the lightbulb assembly of the present invention include visible light defined as having wavelengths in the range of between 400 and 700 nanometers, infrared with longer wavelengths of between 700 nanometers and 1 millimeter, and ultraviolet light with shorter wavelengths of 10 nm and 400 nm. Accordingly, the present invention can include one or more electromagnetic radiation sources/bulbs including a visible light lightbulb (halogen (e.g., emit an "orange" light), a High Intensity Discharge bulb (HID) (e.g., emits a "white" bright light), or a Light Emitting Diode (LED)), an infrared lightbulb and/or UV lightbulb. Any combination of bulb types can be connected with a single connection to the ejectable headlight device of the present invention (e.g., a bouquet of bulbs), or can be connected each individually to a vehicle adapted to have multiple ejectable headlight devices When the lightbulb assembly eject, the electromagnetic radiation source/bulb can be replaced by itself or together with the lens 58. The electromagnetic radiation source/bulb can be decoupled or unscrewed from the lightbulb assembly and replaced. See FIG. 7.

Headlights of the present invention also include replaceable lens as well. The lens 58 can be made from various materials depending on their application. For example, the lens can be made from plastic, glass, rubber, and other materials known in the art or developed in the future. Like the electromagnetic radiation source, the lens can also be removed from the lightbulb assembly and reattached. See FIG. 7. The lens can be removed and/or reattached through the use of a clip, retainer lip, snap, latch, adhesive, retainer, stopper, attachment, fastener, and the like.

In an embodiment, the device is preferably water or liquid proof. The housing and any outer portion of the device can be made of a liquid resistant or liquid proof material and seals/gaskets. Liquid resistant or liquid proof refers to material that resists or prevents liquid from penetrating from the outside through the material.

The present invention can further include optics (e.g., a reflector, a lens) that help direct and distribute the light. The device can include transparent or light passing windows (e.g., lenses), plates, light distributors, or openings to allow, enhance, or direct light to the target areas outside of the vehicle. Lenses can also be shaped to disperse the electromagnetic radiation/light and/or to focus or narrow it. Lenses can also be used to filter certain wavelengths of light. Lenses can be concave or shaped depending on the application. A concave window allows the light to be directed or reflected to a greater surface area. The window, in an embodiment, can also be faceted to provide certain angles so that light distributed to certain targeted areas. Such windows can be shaped to reflect light in multiple directions to maximize the surface area that is being targeted. As such, a window can be concave, polygonal, or otherwise shaped to reflect light in one or more directions.

In a certain embodiment of the present invention, either external reflections (e.g., reflects from a material with a higher refractive index such as aluminum or silver), or internal reflections (e.g., reflects from where the light originates and reflects off of a material with a lower refractive index such as air, vacuum, or water) can be used to tunnel the light to the target area.

A light distributor includes any component that distributes light from a light source to the target area outside the vehicle, including but not limited to light pipes (which distribute light through internal reflections) and light guides (which distribute light through external reflections). An embodiment of the device includes one or more light distributors. As the surface area of the target area increases, for example, the number of light pipes or light guides can also increase. A light distributor can be made from any suitable transmitting material with a high index of refraction, such as a polycarbonate or polymethyl methylacrylate ("PMMA").

Figure 2:
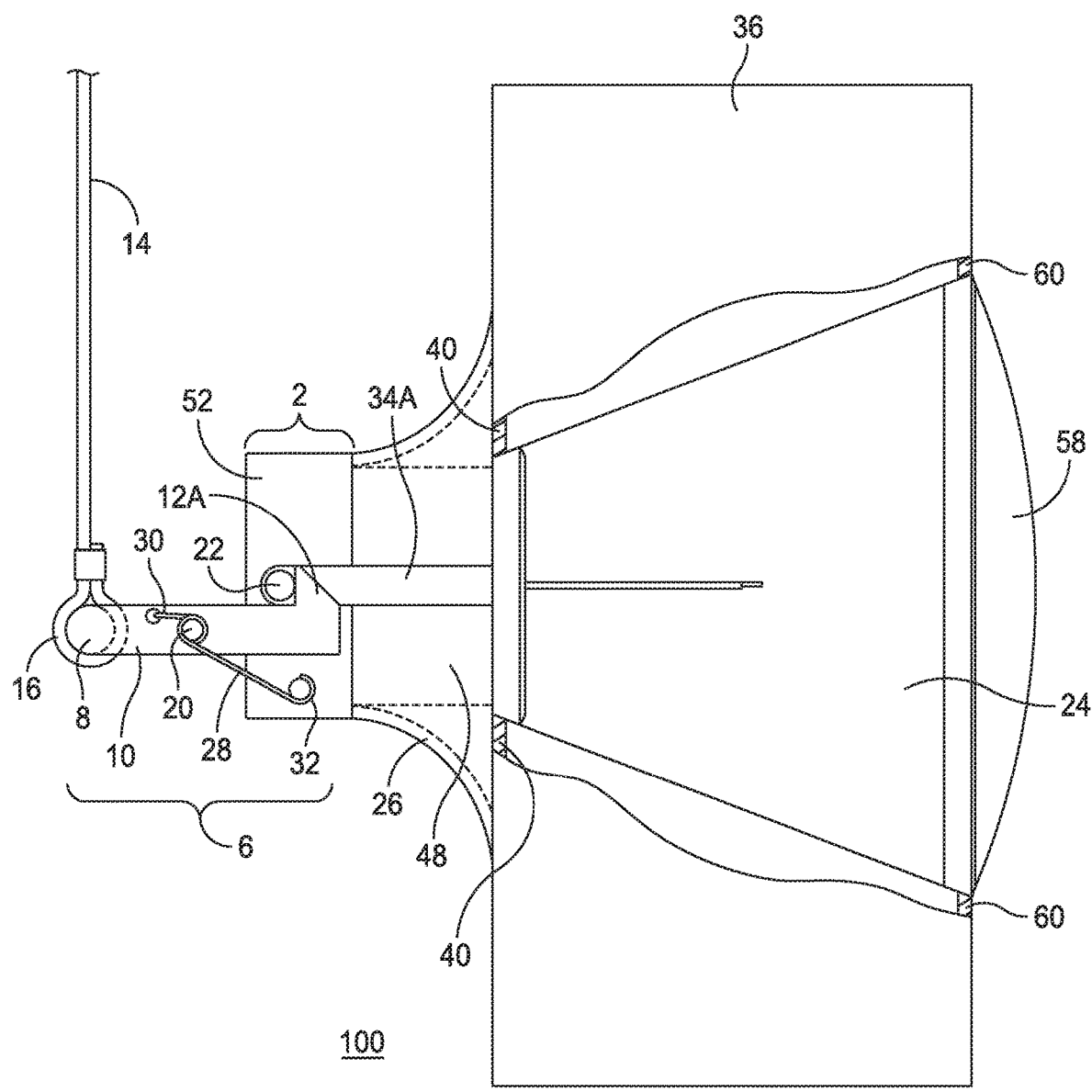
FIG. 2 is a side view of the vehicle headlight device shown in FIG. 1.
Figure 3:
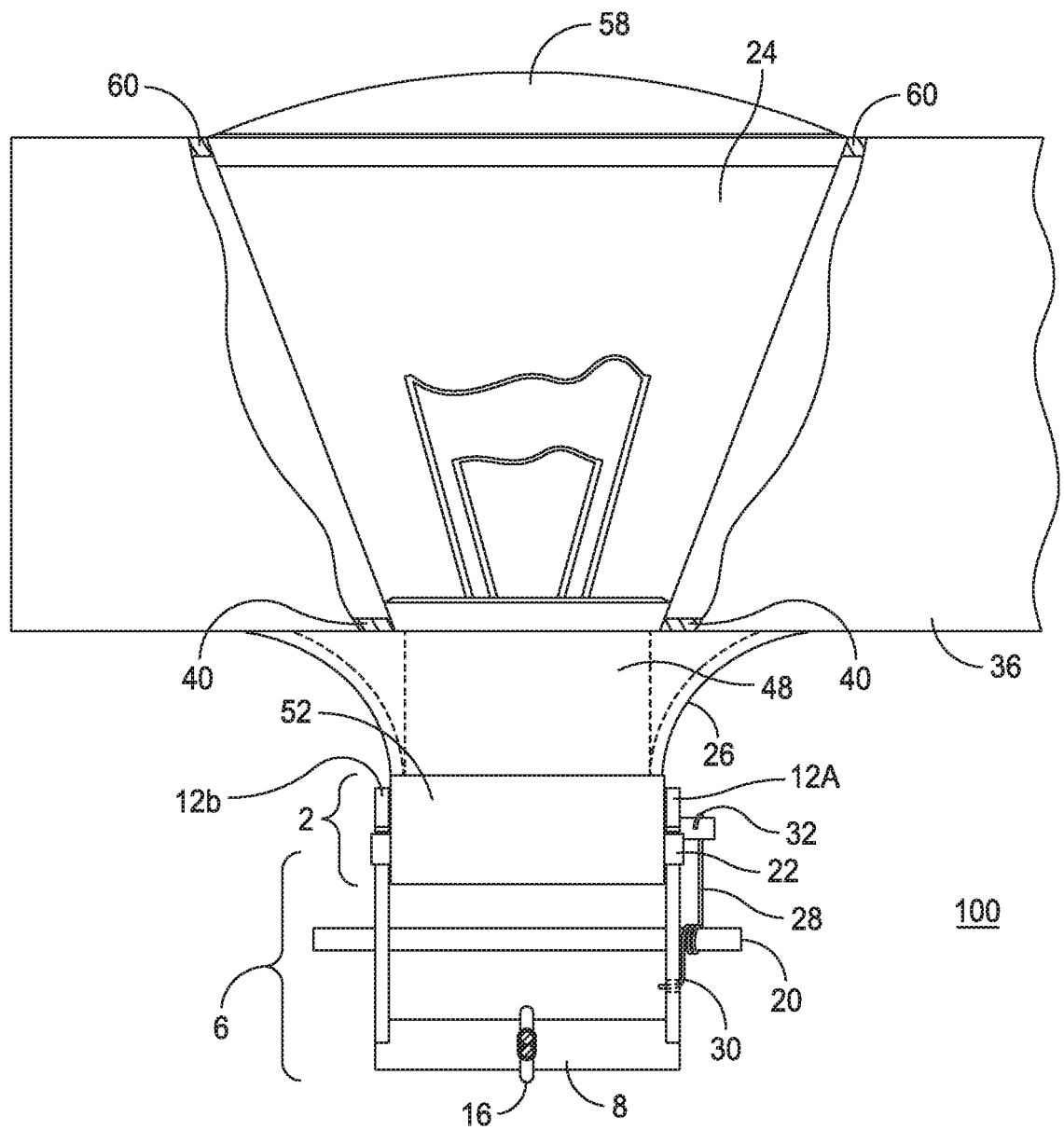
FIG. 3 is a bird's eye view of the vehicle headlight device shown in FIG. 1.

FIG. 2 shows a side view and FIG. 3 shows a bird's eye view of ejectable headlight device 100. As can be seen from these figures, lightbulb assembly 24 is in the locked position. Release spring 28 wraps around pivot pin 20 and anchors at the release arm side and the base. As described above, when cable 14 is pulled, cable attachment 16 pulls on release arm base 8 which overrides the tension in the release spring to disengage release arm extensions 12A and 12B from lightbulb pin 22. When this happens, base spring (not shown) decompresses and pushes lightbulb 24 outward toward the front of the car.

Figure 4:
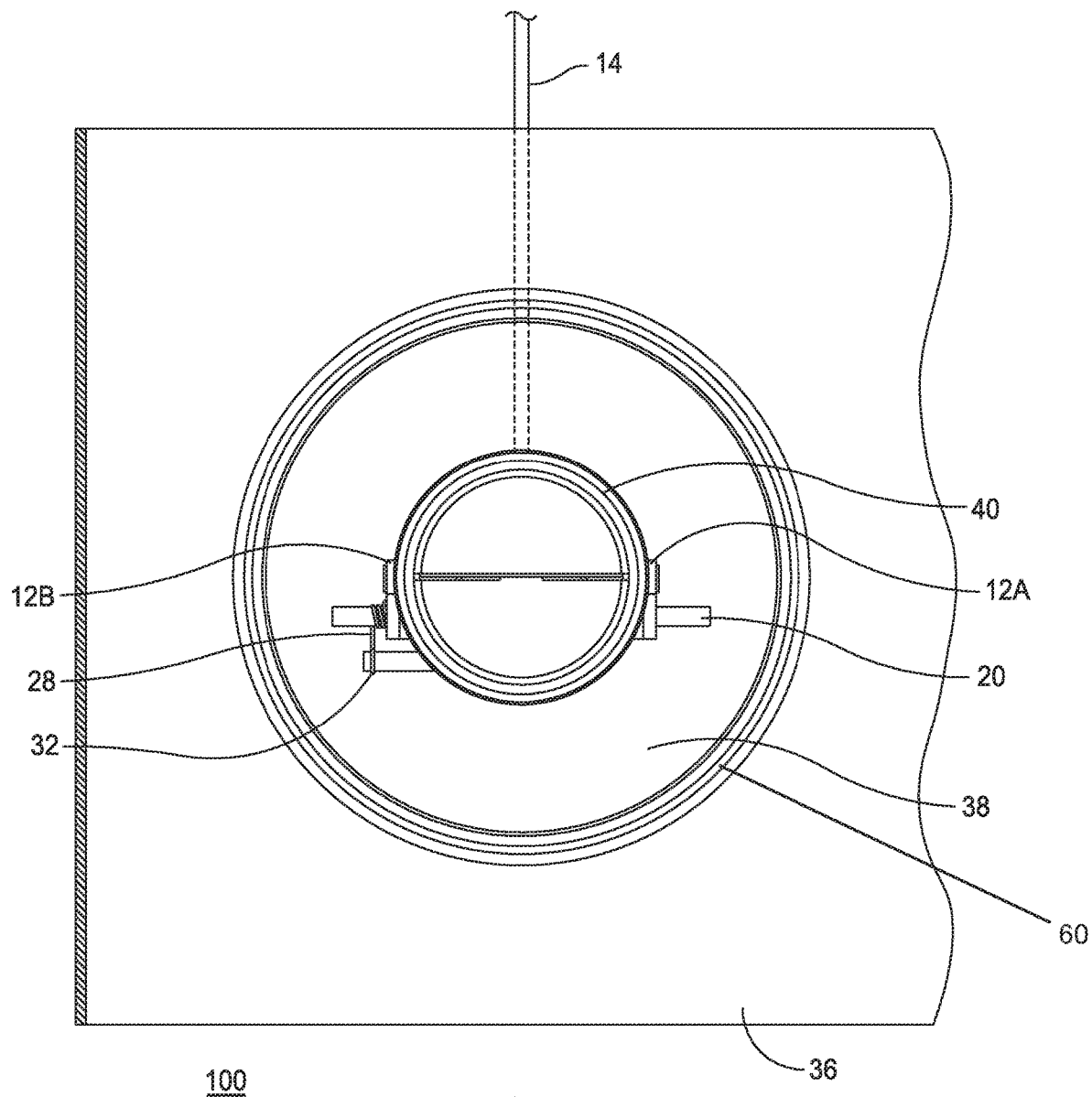
FIG. 4 is a front view of the vehicle headlight device shown in FIG. 1.

FIG. 4 shows the front view of ejectable headlight device 100. From this view, inner seal 40 and outer seal 60 are better seen. These seals allow the lightbulb assembly to be securely installed and prevents penetration of water, wind, dirt and debris from outside into the engine compartment of the vehicle. The lightbulb assembly, when disengaged by the pull, releases toward the front of the car and can be removed. The replacement bulb can be inserted from the front as well. When inserting the replacement bulb, the user simply pushes the bulb into place. The release spring pushes the release arm into place to engage the lightbulb pin of the lightbulb assembly.

Figure 5:
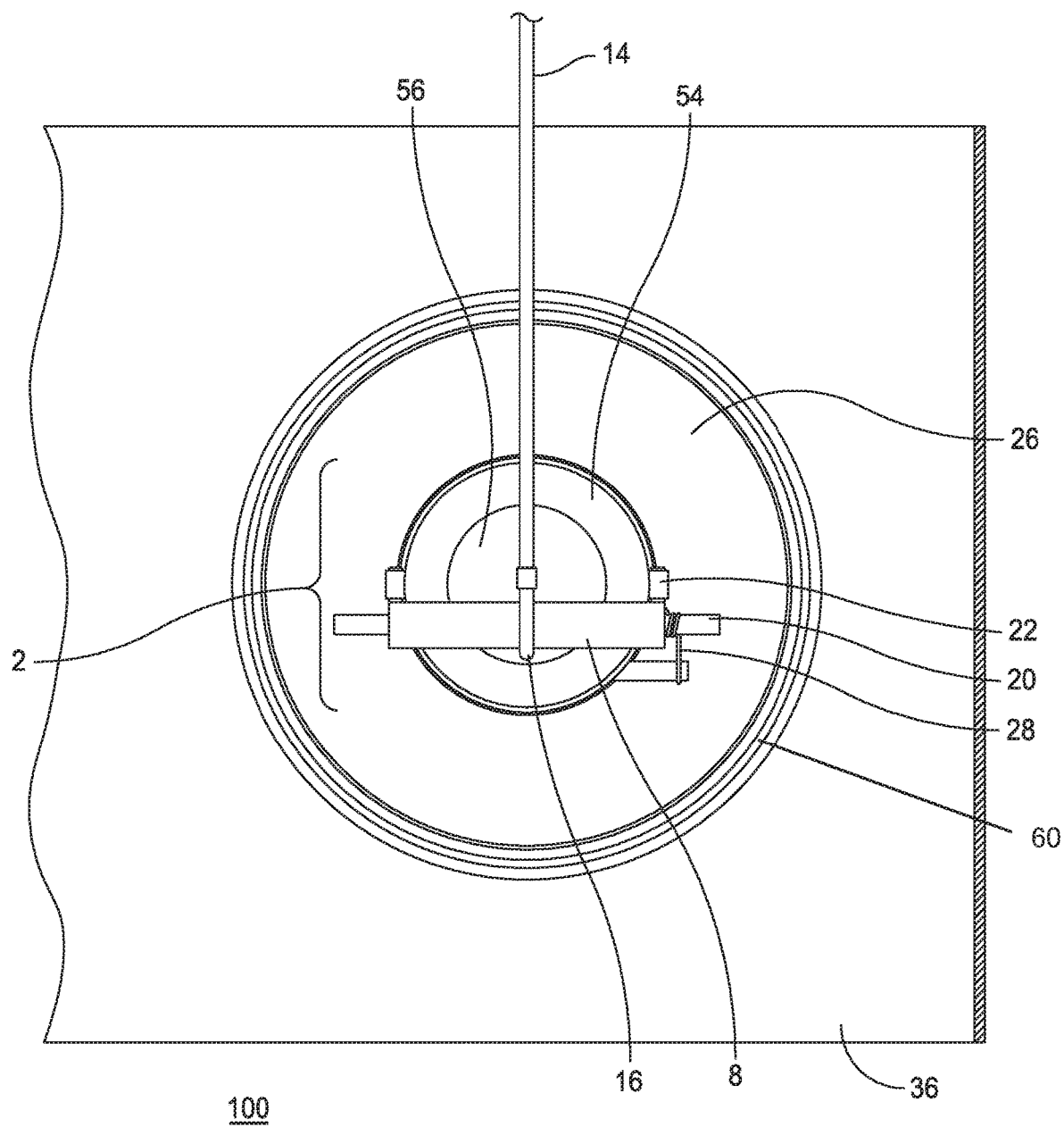
FIG. 5 is a back view of the vehicle headlight device shown in FIG. 1.

FIG. 5 showing the back view of ejectable headlight device 100 provides a better view of base ridge 54 and base extension 26. Base extension is essentially a continuation of base and connects the base to the housing. The base extension can have a conical shape, in part, as shown in the figures, but can take on any shape (e.g., cylindrical, pyramidal, prism, irregular) so long as it connects the base to the housing. The base can be continuous or discontinuous. The base extension can be made of the same material as the base, such as metal, alloy, stainless steel, plastic, rubber, resin, composite and the like. The base extension can also be made of materials now known or developed in the future and/or bear any shape so long as it connects the base to the housing.

FIG. 1 shows the ejectable headlight device 100 in the locked position and FIG. 6 shows it in the unlocked position. In FIG. 6, after cable 14 was pulled, release arm 6 pivots about pivot pin 20 disengaging release arm extension 12A and 12B from lightbulb pin 22. Consequently, base spring (not shown in FIG. 6) decompresses and pushes lightbulb assembly 24 outward toward the front of the vehicle, ejecting the lightbulb assembly. As can be seen from the ejected lightbulb assembly, it has lightbulb assembly base 48 with electrical prongs 50. In certain embodiments where multiple light types (e.g., high beam, low beam, UV, IR, visible light) are used, then additional prongs can also be used as needed. When the lightbulb assembly is locked into place the electrical prongs are in electric communication with the electrical system of the vehicle (e.g., the lightbulb assembly is plugged in). The electrical cord for the vehicle resides at base 2 and receives the prongs.

Figure 7:
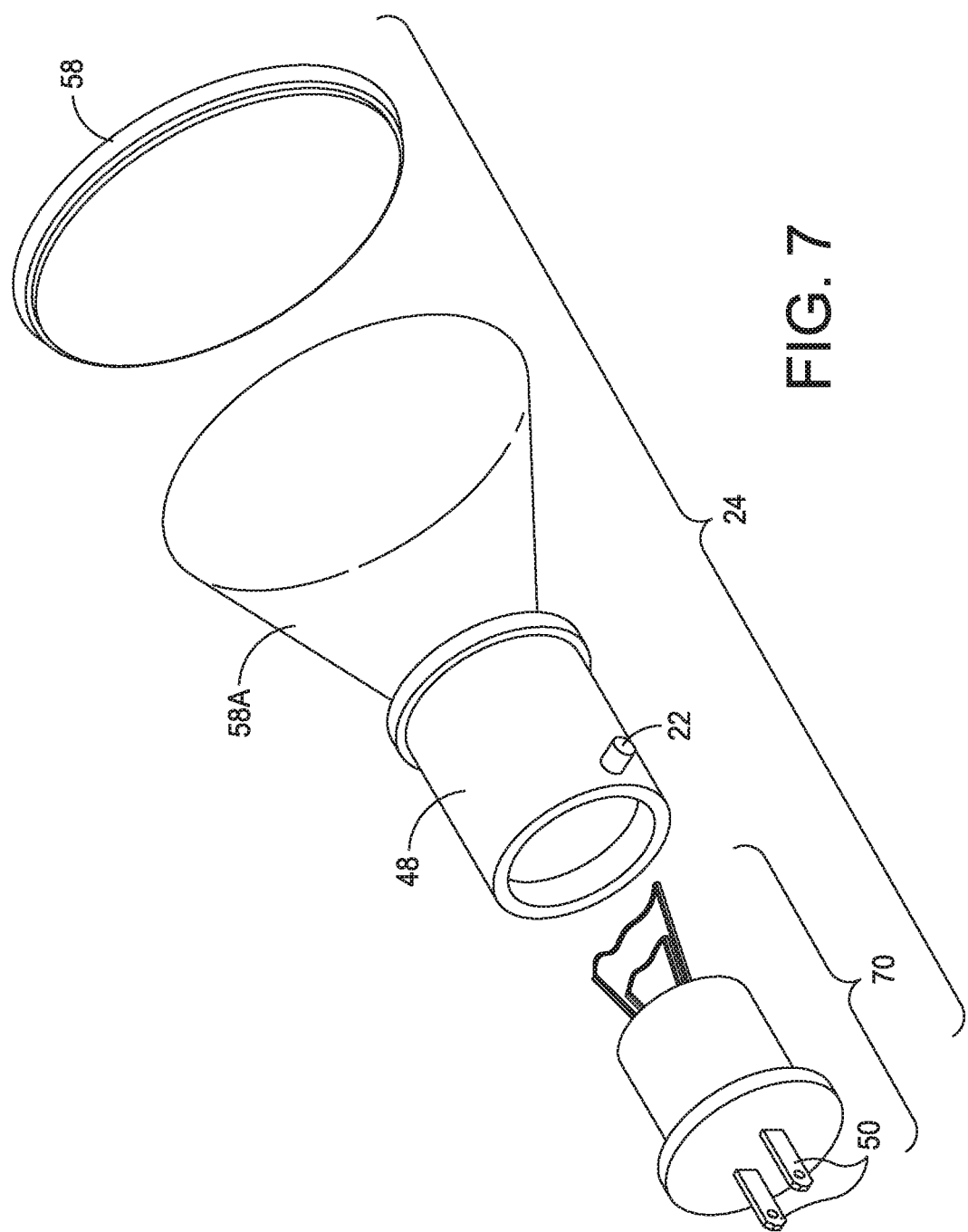
FIG. 7 is a perspective view of the vehicle headlight device with the lightbulb assembly in which the electromagnetic radiation source (e.g., the bulb itself or filament) is separated from the lens and lightbulb housing.

FIG. 7 shows lightbulb assembly 24 in an exploded view. FIG. 7 shows the electromagnetic radiation source 70 (with electrical prongs 50) and lens 58 detached from the rest of lightbulb assembly 24, namely lightbulb base 24 and lens support 58A. As explained herein, the lightbulb assembly is removed and thereafter electromagnetic radiation source 70 can also be removed by detaching it from the rest of the lightbulb assembly. The electromagnetic radiation source include plug 50 and can attach to the assembly by means of a screw, threads or the like. Other methods of attachment can be used to attach the bulb to the lightbulb assembly and include a clip, retainer lip, snap, retainer, stopper, attachment, fastener, and the like. Similarly, lens 58 can also separately detach from the lightbulb assembly. The lens can be attached or detached using a clip, retainer lip, snap, latch, adhesive, retainer, stopper, attachment, fastener, and the like. In an embodiment, the entire lightbulb assembly can be replaced. In another embodiment, the electromagnetic radiation source/bulb, lens or both can be replaced in the lightbulb assembly. Once the electromagnetic radiation source/bulb, lens or both is replaced, the lightbulb assembly can be inserted into the ejectable headlight device, as described herein. Alternatively, an entire new lightbulb assembly can replace the existing one.

A vehicle includes, for example, automobiles, boats, trains, airplanes, industrial equipment with headlights and the like.

The terms about, approximately, substantially, and their equivalents may be understood to include their ordinary or customary meaning. In addition, if not defined throughout the specification for the specific usage, these terms can be generally understood to represent values about but not equal to a specified value. For example, 1%, 0.9%, 0.8%, 0.7%, 0.6%, 0.5%, 0.4%, 0.3%, 0.2%, 0.1%, 0.09% of a specified value.

The terms, comprise, include, and/or plural forms of each are open ended and include the listed items and can include additional items that are not listed. The phrase "And/or" is open ended and includes one or more of the listed items and combinations of the listed items.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. An ejectable headlight device for replacement of one or more lightbulb assemblies from the front of a vehicle, wherein the lightbulb assembly has one or more lightbulb pins, a replaceable electromagnetic radiation source and a replaceable lens; the device comprises:
    a) one or more ejectors;
    b) a base that houses the one or more ejectors, said base having one or more guides for receiving the one or more lightbulb pins;
    c) a release arm, at the base, that engages the one or more lightbulb pins;
    d) a pivot point, at the base; wherein when the release arm is engaged, the release arm pivots about the pivot point; and
    e) a pull attached to the release arm, wherein the pull engages the release arm; and
    wherein when the release arm secures the one or more lightbulb pins to the base, the lightbulb assembly is in the locked position, and when the pull engages the release arm which allows the release arm to pivot about the pivot point and disengage the one or more lightbulb pins, the lightbulb assembly is in the unlocked position.

2. The ejectable headlight device of claim 1, wherein when the lightbulb assembly is in the unlocked position, one or more lightbulb pins slide along one or more guides to thereby release the lightbulb assembly toward the front of the vehicle.

3. The ejectable headlight device of claim 2, wherein once the lightbulb assembly is released, the replaceable electromagnetic radiation source, the replaceable lens, or both are replaced.

4. An ejectable lightbulb assembly for an ejectable headlight device for replacement of the lightbulb assembly from the front of a vehicle; the lightbulb assembly comprises:
    a) one or more lightbulb pins, a lightbulb base, a replaceable electromagnetic radiation source, an electrical connector, and a replaceable lens; for use with the ejectable headlight device that comprises:
        i) one or more ejectors;
        ii) a base that houses the one or more ejectors, having one or more guides for receiving the one or more lightbulb pins;
        iii) a release arm, at the base, that engages the one or more lightbulb pins;
        iv) a pivot point, at the base; wherein when the release arm is engaged, the release arm pivots about the pivot point; and
        v) a pull attached to the release arm, wherein the pull engages the release arm; and
    wherein when the release arm secures the one or more lightbulb pins to the base, the device is in the locked position, and when the pull engages the release arm which allows the release arm to pivot about the pivot point and disengage the one or more lightbulb pins, the device is in the unlocked position.

5. The ejectable lightbulb assembly for an ejectable headlight device of claim 4, wherein the electromagnetic radiation source comprises visible light lightbulbs, infrared lightbulbs, ultraviolet bulbs or a combination thereof.

6. The ejectable lightbulb assembly for an ejectable headlight device of claim 5, wherein the visible light lightbulb comprising a halogen bulb, a High Intensity Discharge bulb, a Light Emitting Diode bulb, or a combination thereof.

7. The ejectable lightbulb assembly for an ejectable headlight device of claim 4, wherein the replaceable electromagnetic radiation source is detachable from the ejectable lightbulb assembly.

8. The ejectable lightbulb assembly for an ejectable headlight device of claim 4, wherein the replaceable lens is detachable from the ejectable lightbulb assembly.

9. A method for using an ejectable headlight device for replacement of a first lightbulb assembly from the front of a vehicle, wherein the first lightbulb assembly has one or more first lightbulb pins, a replaceable electromagnetic radiation source and a replaceable lens; the device comprises
    a) one or more ejectors;
    b) a base that houses the one or more ejectors, having one or more guides for receiving the one or more first lightbulb pins;
    c) a release arm, at the base, that engages the one or more first lightbulb pins;
    d) a pivot point, at the base; wherein when the release arm is engaged, the release arm pivots about the pivot point; and
    e) a pull attached to the release arm, wherein the pull engages the release arm; and
    the method comprises the steps of:

engaging the pull, wherein the pull engages the release arm which allows the release arm to pivot about the pivot point and disengage the first lightbulb pin, thereby putting the first lightbulb assembly in the unlocked position.

10. The method of claim 9, after removing the first lightbulb assembly, further comprising inserting from the front of the vehicle a second lightbulb assembly having one or more second lightbulb pins, wherein the release arm secures the second lightbulb pin to the base, thereby putting the second lightbulb assembly in the locked position.

11. The method of claim 10, wherein the second lightbulb assembly has a replaced electromagnetic radiation source, lens or both.

12. The method of claim 9, further including removing the first lightbulb assembly from the front of the vehicle.

13. The method of claim 9, further including removing or replacing the electromagnetic radiation source.

14. The method of claim 9, further including removing or replacing lens.

15. A method for inserting a lightbulb assembly that has one or more lightbulb pins, a replaceable electromagnetic radiation source and a replaceable lens; wherein the lightbulb assembly is inserted into an ejectable headlight device for replacement of the lightbulb assembly from the front of a vehicle, the device comprises
   a) one or more ejectors;
   b) a base that houses the one or more ejectors, having one or more guides for receiving the one or more lightbulb pins;
   c) a release arm, at the base, that engages the one or more lightbulb pins;
   d) a pivot point, at the base; wherein when the release arm is engaged, the release arm pivots about the pivot point; and
   e) a pull attached to the release arm, wherein the pull engages the release arm; and
   the method comprises the steps of:
      inserting the lightbulb assembly from the front of the vehicle, wherein the release arm secures the lightbulb pin to the base, thereby putting the lightbulb assembly in the locked position.

16. The method of claim 15, wherein the lightbulb assembly has a replaced electromagnetic radiation source, lens or both.

17. An ejectable headlight system for replacement of the lightbulb assembly from the front of a vehicle, wherein the lightbulb assembly has one or more lightbulb pins; the system comprises
   a) an ejectable headlight device that comprises
      i) one or more ejectors;
      ii) a base that houses the one or more ejectors, having one or more guides for receiving the one or more lightbulb pins;
      iii) a release arm, at the base, that engages the one or more lightbulb pins;
      iv) a pivot point, at the base; wherein when the release arm is engaged, the release arm pivots about the pivot point; and
      v) a pull attached to the release arm, wherein the pull engages the release arm; and
      wherein when the release arm secures the one or more lightbulb pins to the base, the device is in the locked position, and when the pull engages the release arm which allows the release arm to pivot about the pivot point and disengage the one or more lightbulb pins, the device is in the unlocked position; and
   b) a lightbulb assembly that comprises one or more lightbulb pins, a lightbulb assembly base, a replaceable electromagnetic radiation source, an electrical connector, and a replaceable lens.

18. The ejectable headlight system of claim 17, further comprising visible light lightbulbs, infrared lightbulbs, ultraviolet bulbs or a combination thereof.

* * * * *